F. L. WATERMAN.
APPARATUS FOR SEPARATING SUSPENDED SOLIDS FROM LIQUIDS.
APPLICATION FILED JULY 25, 1917.
1,279,949.
Patented Sept. 24, 1918.
4 SHEETS—SHEET 3.
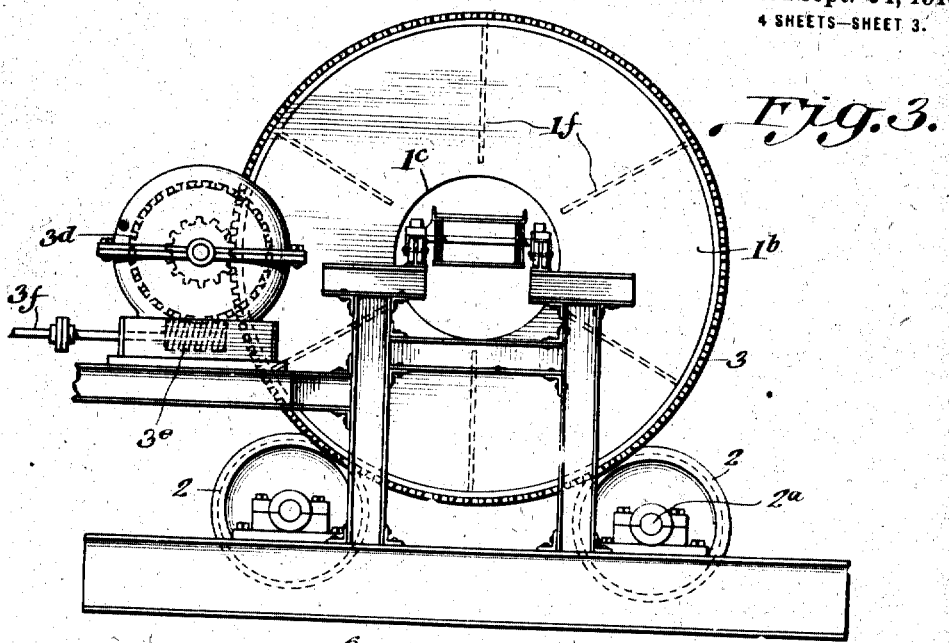
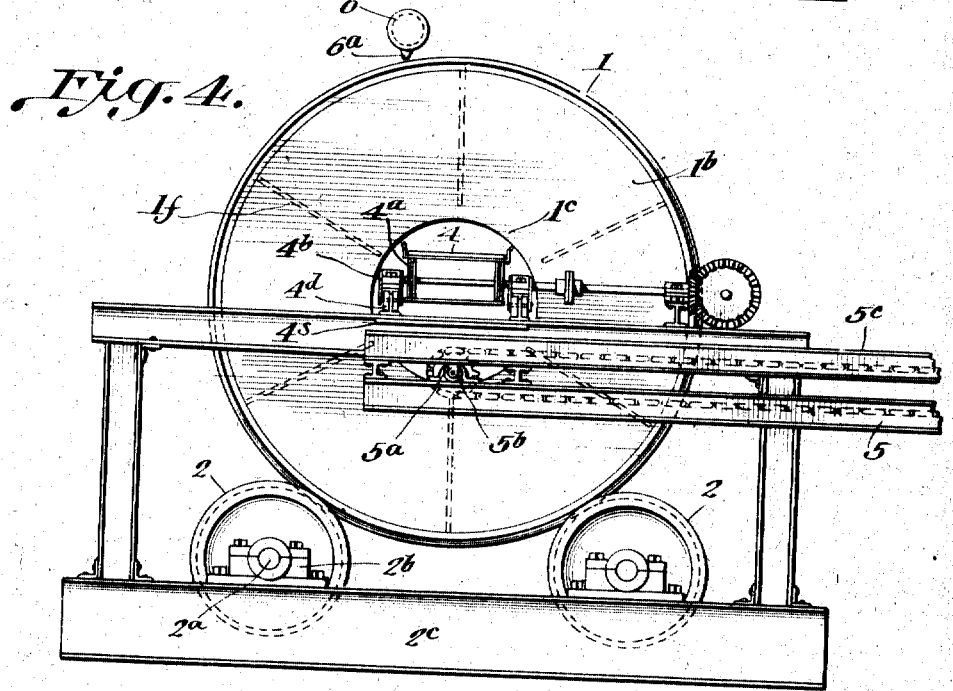

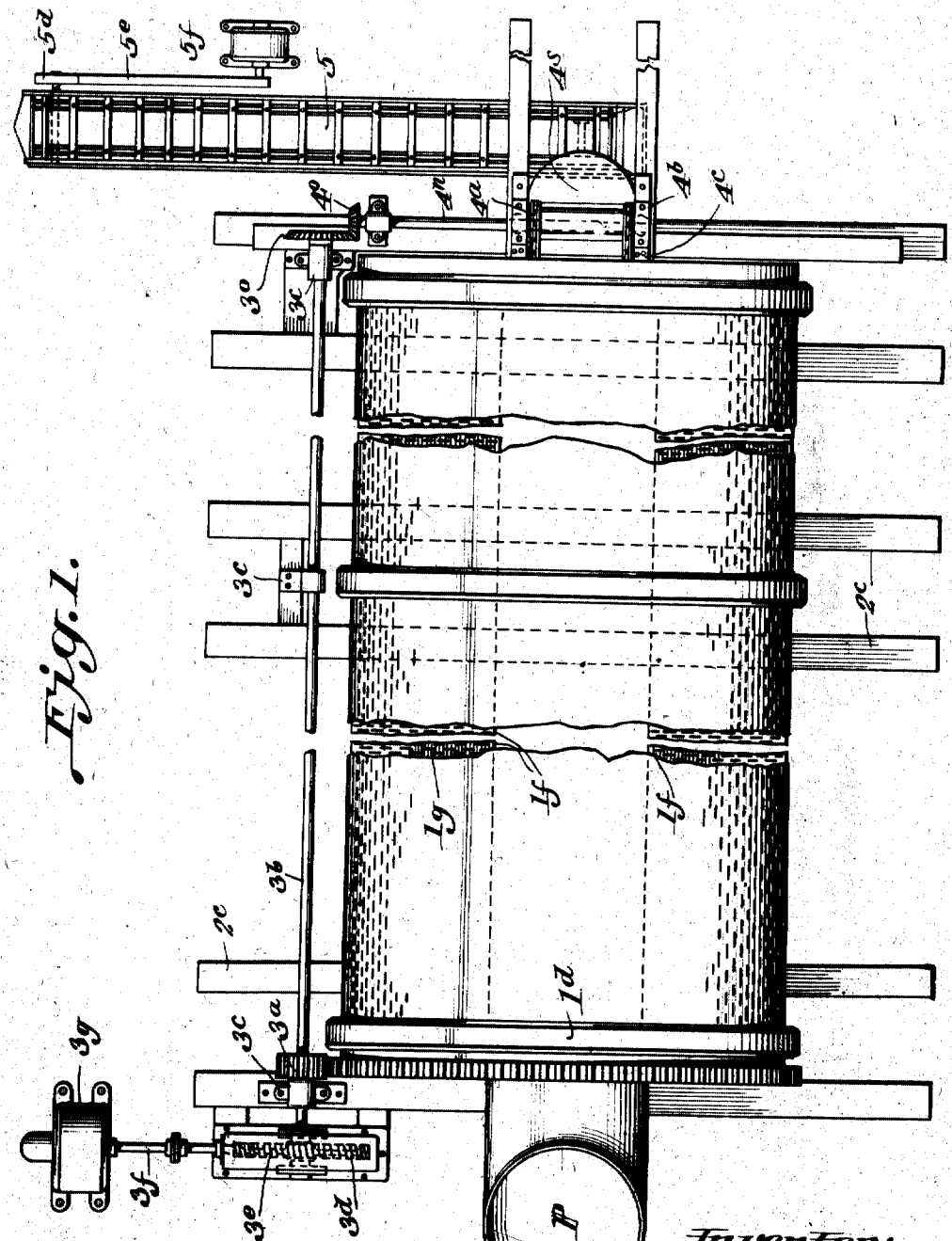

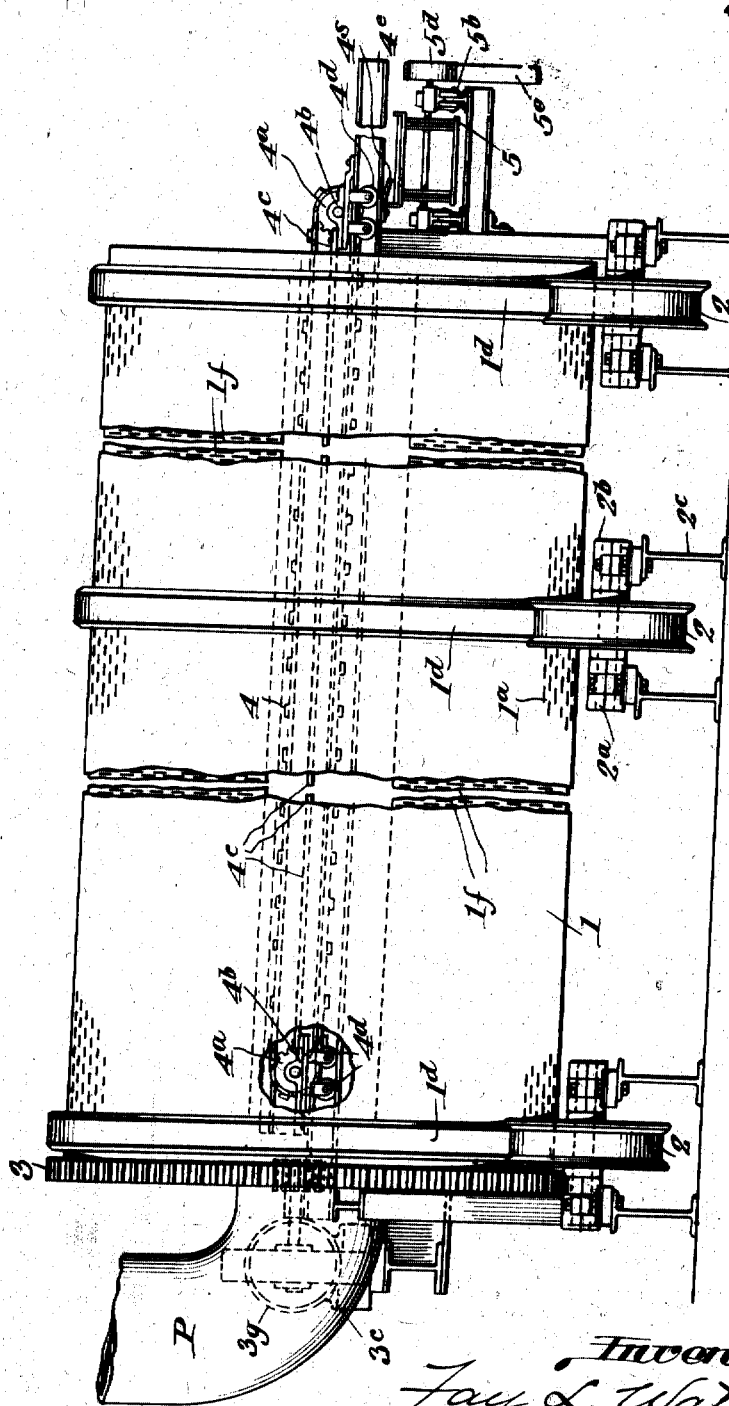

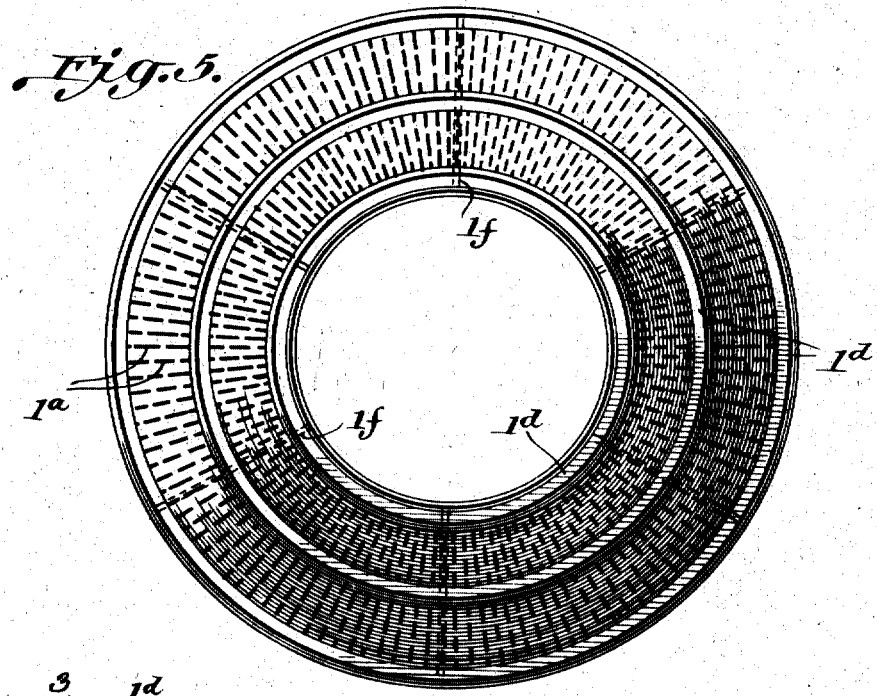
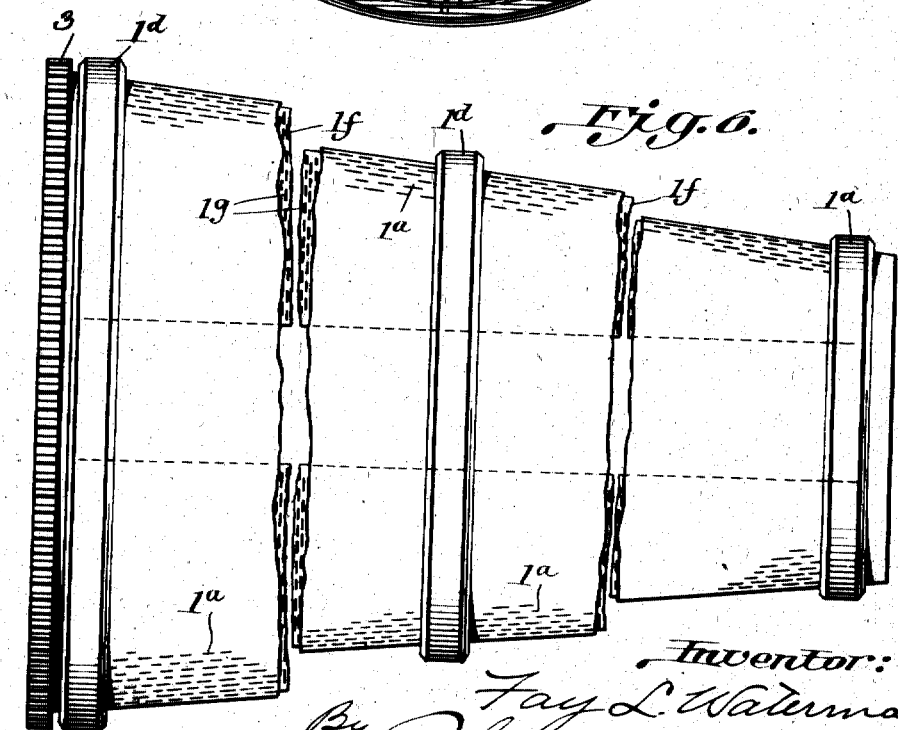

UNITED STATES PATENT OFFICE.

FAY L. WATERMAN, OF ENDICOTT, NEW YORK.

APPARATUS FOR SEPARATING SUSPENDED SOLIDS FROM LIQUIDS.

1,279,949.   Specification of Letters Patent.   Patented Sept. 24, 1918.

Application filed July 25, 1917. Serial No. 182,785.

*To all whom it may concern:*

Be it known that I, FAY L. WATERMAN, a citizen of the United States, residing at Endicott, in the county of Broome and State of New York, have invented certain new and useful Improvements in Apparatus for Separating Suspended Solids from Liquids; and I hereby declare that the following is a full, clear, and exact description thereof, reference being had to the accompanying drawings, which form part of this specification.

This invention is a novel apparatus for separating solids in suspension from the liquid containing same.

The apparatus is intended for use in connection with sewage disposal plants in cities, and also in tanneries and other manufacturing plants where the waste fluids contain a considerable percentage of large solids in suspension which can be separated from the liquids by straining.

The object of the invention is to provide an apparatus whereby suspended solids may be quickly separated from the fluid and the separated solids discharged at any desired point, while the strained fluid is allowed to pass on to a point of discharge, or for further treatment.

The invention will be explained with reference to the accompanying drawings which illustrate one practical apparatus embodying the invention, and the essential features and combinations of parts for which protection is desired are set forth in the claims following the description.

In said drawings:

Figure 1 is a top plan view of the apparatus partly broken away.

Fig. 2 is a side elevation thereof partly broken away.

Fig. 3 is an end elevation thereof.

Fig. 4 is an opposite end elevation of the apparatus.

Fig. 5 is an end view of a modified form of the cylinder.

Fig. 6 is a side view of Fig. 5.

The apparatus as shown comprises a cylinder or drum 1, which may be made of reticulated sheet metal, preferably steel or brass, about $\frac{1}{4}$ inch in thickness; and is preferably provided with slots $1^a$ which may be about three inches in length and $\frac{1}{16}$ of an inch wide on the interior of the drum and $\frac{3}{32}$ of an inch on the exterior, having the wider opening on the outside so that liquids can be easily and immediately released. The slots are to be near together as indicated in the drawings.

The cylinder 1 is provided at its ends with suitable heads $1^b$ which stiffen and support the ends of the cylinder and are provided with central openings $1^c$. The cylinder is furthermore preferably provided with exterior annular reinforcing hoops $1^d$ which strengthen the drum and also support it upon grooved rollers 2 mounted on stub shafts $2^a$ journaled in bearings $2^b$ mounted on suitable beams as $2^c$ or other suitable foundation. These rollers 2 support the cylinder in preferably a horizontal position, above a receiver (not shown) into which the liquid escaping from the cylinder is directed.

The cylinder is provided on its interior with a series of radially disposed wings or partitions $1^f$ which preferably extend from the periphery of the cylinder nearly to the edges of the openings $1^c$, but leave an annular open space or chamber axially of and within the cylinder for the accommodation of the conveyer, hereinafter referred to, for removing solids from the cylinder. The wings $1^f$ may be made of sheet metal, such as steel or brass and are of sufficient thickness to enable them to support the solids which may be deposited thereon or carried up thereby in the cylinder. These wings may be reticulated, and are shown as slotted but the slots in the wings preferably extend radially of the cylinder, or transversely of the wings, as shown at $1^g$, instead of longitudinally thereof, so that the solids will slide more readily off of the wings when the apparatus is in operation.

The fluid containing solids in suspension may be introduced into one end of the cylinder by means of a pipe P which enters the cylinder through the opening $1^c$ in the adjacent head $1^b$, as indicated in Figs. 1 and 2. The fluid may be admitted in any convenient manner.

The grooved rollers 2 are arranged in pairs beneath the cylinder, as indicated in Figs. 2 and 3, so as to support it while permitting its rotation. The cylinder may be rotated by any suitable means. In the example shown, it is provided with an annular gear 3 on its inlet end meshing with a pinion $3^a$ on a shaft $3^b$ journaled in bearings $3^c$ mounted on the framing as indicated in Fig. 2, or other convenient support. The shaft 3 carries a worm wheel $3^d$ meshing with a worm $3^e$, on a shaft $3^f$ which shaft may be driven by a motor $3^g$, or other suitable means.

Extending longitudinally of and within the cylinder 1 is an endless conveyer 4, which may be of any suitable construction. As shown this conveyer runs over rollers $4^a$ mounted in suitable bearings $4^b$ attached to the opposite ends of a bar or frame $4^c$, supported by rollers or wheels $4^d$ on bars $4^e$ that extend longitudinally of and within the cylinder, and are suitably supported at their ends upon the framing of the apparatus, as indicated in the drawings; so that the conveyer 4 may, if desired, be bodily withdrawn from the cylinder for repairs.

When the conveyer is in operative position within the cylinder, as in Figs. 1 and 2, the outermost roller $4^a$ may be rotated by a shaft $4^n$ journaled in suitable bearings on the main framing as indicated in the drawings and having a beveled gear $4^o$ on one end meshing with a beveled gear $3^b$ on the adjacent end of the shaft $3^b$ as indicated in the drawings. By properly proportioning the gearing the conveyer may be driven at any desired speed relative to the rotative movement of the cylinder 1, and preferably in such direction that the upper run of the conveyer moves away from the inlet pipe P.

The conveyer 4 extends outside of the cylinder and is adapted to discharge material over the outermost drum $4^a$ onto an underlying conveyer 5, which may be of any suitable construction, but as shown is an endless conveyer running over suitable rollers $5^a$ journaled in bearings $5^b$ on the framing $5^c$. An apron $4^s$ may be arranged beneath the outer end of conveyer 4 to direct the solids onto conveyer 5.

The conveyer 5 may be constructed and mounted like conveyer 4 if desired, and may be operated by means of a pulley $5^d$ on the outer roller $5^b$ driven by a belt $5^e$ from a motor $5^f$; or in any other suitable manner. The conveyer 5 is adapted to convey the solids discharged from the conveyer 4 to any suitable point of discharge.

In some cases the cylinder instead of being cylindric may be tapered as indicated in Figs. 5 and 6 of the drawings. The general construction and arrangement of such tapered cylinder is the same as that shown in Figs. 1 and 2, excepting that the receiving end of the cylinder is larger than the discharge end.

To facilitate the discharge of solids from the wings $1^t$, and to keep the slots in the cylinder clear, jets of air may be directed against the exterior of the cylinder and into the same through the slots therein. As shown an air pipe 6 provided with suitable jet apertures is located exterior to and adjacent the top of the cylinder, as indicated in Fig. 4, and supplied with compressed air by any suitable means, not shown. The air jets entering through the perforations will force the solids adhering to the wall of the cylinder to separate therefrom and drop by gravity onto the conveyer 4.

Operation.

Any fluid containing the solids in suspension which it is desirable to separate therefrom may be discharged into the cylinder as the cylinder is rotated. The fluid readily escapes from the cylinder through the perforations therein while the solids coarser than the perforations in the cylinder are retained therein. As the cylinder revolves the solids are carried up by the wings $1^t$ and are separated from the fluid as the wings raise the solids above the level of the fluid by reason of the perforations in the cylinder and wings through which perforations the fluid escapes. The separated solids are discharged by gravity, sliding off of the wings onto the conveyer 4 as the wings move above and over the conveyer and the solids are carried out of the cylinder by conveyer 4 and discharged onto the transverse conveyer 5. The separated fluid escaping from the cylinder may be directed into a tank for further treatment, or conducted to any desired point of discharge.

What I claim is:

1. Apparatus for separating solids in suspension from fluids; comprising a reticulated metal cylinder, having annular bands on its exterior and provided with end heads each having a central opening; longitudinal radially arranged wings within and attached to the cylinder; a fixed support extending into the cylinder; a carriage mounted on said support; a conveyer mounted on said carriage, and means for operating said conveyer.

2. Apparatus for separating solids in suspension from fluids; comprising a reticulated metal cylinder; longitudinal radially disposed wings within and attached to the cylinder; a support extending into the cylinder; a carriage mounted on said support; a conveyer mounted on said carriage; a shaft for operating said conveyer; a main shaft; gearing between the main shaft and the conveyer shaft; and gearing between the main shaft and the cylinder.

3. Apparatus for separating solids in suspension from fluids; comprising a reticulated metal cylinder; annular hoops on the exterior of said cylinder; longitudinal radially disposed wings within and attached to the cylinder; grooved rollers arranged at opposite sides of the cylinder and engaging said hoops to support the cylinder; a support extending into the cylinder; a carriage mounted on said support; a conveyer mounted on said carriage; means for operating the conveyer, and means for rotating the cylinder.

4. Apparatus for separating solids in suspension from fluids; comprising a reticulated metal cylinder; annular bands or hoops on the exterior of said cylinder; longitudinal radially disposed wings within and attached to the cylinder; grooved rollers arranged at opposite sides of the cylinder and engaging said hoops to support the cylinder; a support extending into the cylinder; a carriage mounted on said support, an endless conveyer mounted on said carriage; a main shaft; gearing between the main shaft and the conveyer; and gearing between the main shaft and the cylinder.

5. Apparatus for separating solids in suspension from fluids; comprising a reticulated metal cylinder, having annular bands on its exterior and provided with end heads each having a central opening; longitudinal radially arranged wings within and attached to the cylinder; a fixed support extending into the cylinder; a carriage mounted on said support, a conveyer mounted on said carriage; means for operating said conveyer; a second conveyer exterior to the cylinder and extending adjacent the discharge end of the first conveyer; and means for operating the second conveyer.

6. Apparatus for separating solids in suspension from fluids; comprising a reticulated metal cylinder; longitudinal radially disposed wings within and attached to the cylinder; a support extending into the cylinder; a carriage mounted on said support; an endless conveyer mounted on said carriage; a shaft for operating said conveyer; a main shaft; gearing between the main shaft and the conveyer shaft; gearing between the main shaft and the cylinder; a second conveyer exterior to the cylinder and adjacent the discharge end of the first conveyer; and means for operating the second conveyer.

7. Apparatus for separating solids in suspension from fluids; comprising a reticulated metal cylinder, annular bands or hoops on the exterior of said cylinder; longitudinal radially disposed wings within and attached to the cylinder; grooved rollers arranged at opposite sides of the cylinder and engaging said hoops to support the cylinder; a support extending into the cylinder; a carriage mounted on said support, an endless conveyer mounted on said carriage; a main shaft, gearing between the main shaft and the conveyer, and gearing between the main shaft and the cylinder for rotating the latter; a second conveyer exterior to the cylinder and extending transversely thereof adjacent the discharge end of the first conveyer and means for operating the transverse conveyer.

In testimony that I claim the foregoing as my own I affix my signature.

FAY L. WATERMAN.